INVENTOR
RICHARD H. FEEHS

BY Howard J. Rudge
ATTORNEY

United States Patent Office 3,554,887
Patented Jan. 12, 1971

3,554,887
PHOTOCHEMICAL APPARATUS AND PROCESS
Richard H. Feehs, Woodstown, N.J., assignor to E. I. du Pont de Nemours and Company, Wilmington, Del., a corporation of Delaware
Filed Mar. 16, 1966, Ser. No. 534,765
Int. Cl. B01j 1/00, 1/10
U.S. Cl. 204—163                               15 Claims

ABSTRACT OF THE DISCLOSURE

A photochemical reactor comprising at least one polymeric resin reactor tube of from 0.05 to 0.50 inch outside diameter which is capable of transmitting radiant energy of from 2200 A. to 6000 A. and which is maintained at a fixed distance from the radiant energy source, a means for introducing and passing reactant materials through said reactor tube, and the process for conducting a radiation initiated chemical reaction in such a reactor.

---

Photochemical processes, that is, chemical processes which are activated by the action of light, are well known in the chemical art and currently used in industry. The usual photochemical reactor design consists of a source of reaction activating light separated from the reacting materials by a wall fabricated from some sort of silica material. The usual method is to have the reactants flow past the light source in tubes made of a silica material such as glass. Many other designs have been proposed, one of which is bubbling the reaction gases through an inert, light-transparent liquid contained in a vessel wherein the light source is within the vessel and is separated from the reaction medium by being enclosed in a silica or glass housing.

The present invention is particularly directed to the type of photochemical reactor where the reactants flow in reactor tubes. In order to carry out many highly exothermic reactions in this type of reactor, it is essential to high productivity that the tubular material not only readily transmit the initiating radiant energy, but also allow the dissipation of large amounts of heat. Unless the generated heat is dissipated, undesirable side reactions often occur. In this respect, photochemical chlorination reactions (which are especially known to generate a high heat of reaction) are purposely operated at low conversions to avoid side reactions.

Silica materials of some sort, such as glass, therefore, are almost exclusively used in constructing photochemical reactor tubes, since among the materials that readily transmit radiant energy, the silica-containing materials have a reasonably high thermal conductivity. Due to the fragile nature of this material, however, glass reactor tubes are generally of large diameter. The large-diameter tubes, having thicker walls, are better able to withstand the rough mechanical treatment and thermal shock to which the reactor tubes are continuously subjected.

The removal of heat from the photochemical reactor has been extensively studied by the art. This heat is not only generated by the reaction of the chemicals, but also from the light source. The necessity of removing this heat becomes critical in gas phase photochlorinations where the heat capacity of the gas is too low to absorb the heat of reaction.

Several methods have been proposed for removing this heat in reactors carrying out gas phase reactions. One proposed method is to flood the space around the reaction tubes with water or some other cooling medium. Another method is to dilute the reaction products with an inert or recycle gas stream. In the common photochemical reactor containing the large-diameter, thick-wall, silica tubes, the first method is inadequate to carry away the heat of reaction which is rapidly generated in the large tubes by the gas reaction. The latter method has the disadvantage in that the inert material causes a reduced rate of reaction. Due to this ineffective removal of heat from the reactor in gas phase photochlorinations, the available photochemical reactors are purposely operated at low conversions and in many cases give poor yields of the desired products.

The present invention is, therefore, directed to a unique photochemical reactor which unexpectedly enables free-radical, radiation-initiated reactions to be carried out in surprisingly high conversion rates and with a corresponding high yield of the desired product. More specifically, the photochemical reactor of this invention employs at least one small-diameter reactor tube, and preferably a multitude of reactor tubes, having from 0.05 inch to 0.50 inch outside diameter with a wall thickness of from 3% to 15% of the outside diameter. In contrast to the photochemical reactors of today, the photochemical reactor tubes of this invention are not made from glass or silica-containing materials. The reactor tubes of the present invention are made from polymeric resin materials capable of transmitting ultraviolet and visible light radiant energy between 2200 A. and 6000 A. These tubes have unexpectedly been found to be particularly suitable for exothermic reactions induced by radiant energy despite thermal conductivities one-fifth as great as that of glass.

The polymers of $C_2$ to $C_3$ ethylenically unsaturated monomers are the preferred polymeric resin materials for making the reaction tubes of the photochemical reactor of the present invention. Most preferred are the polymers of halogenated $C_2$ to $C_3$ ethylenically unsaturated monomers. Specific examples of such polymers are polyethylene, polytetrafluoroethylene, tetrafluoroethylene-hexafluoropropylene copolymer, polychlorotrifluoroethylene, plyvinylidene fluoride, and vinyl chloridevinylidene chloride copolymer.

All of the above polymeric resin materials readily transmit radiant energy of from about 2200 A. to 6000 A. In addition to this ability to transmit radiant energy, these polymeric materials also possess several other properties which are uniquely used in the above-described photochemical reactor. For example, the polymeric resin materials of this invention possess a high degree of flexibility. This high degree of flexibility, which is due to the pliable and non-fragile characteristics of polymeric resin material, allows the reactor tubes to be fashioned in small diameters. The small-diameter tubes are important in the reactor's ability to remove heat from the reactor as will be discused hereinafter. The high degree of flexibility also enables the tubes to be positioned around the light source in varying configurations. For example, the multiple reaction tubes can be situated around and parallel to a tubular light source or the band of multiple tubes may be spirally wound around and along the length of a tubular light source. These varying configuration enable the reactor to be designed so that each tube in the reactor is exposed to uniform levels of radiant energy intensity throughout the length of the reactor.

As heretofore stated, the removal of the heat of reaction from the reactor tubes is a controlling factor in the conversion and yield rates in photochemical reactors. It is well known that polymeric resin materials generally have low thermal conductivities and, for this reason, it was unexpected that polymeric resins would be useful materials from which to fabricate reactor tubes for photochemical reactors. For example, Table I below gives typical thermal conductivities for various transparent materials.

TABLE I

| Material: | Thermal conductivity B.t.u./hr.×ft.²×° F./ft. |
|---|---|
| Polyvinylidene chloride | 0.05 |
| Tetrafluoroethylene - hexafluoropropylene copolymer | 0.11 |
| Polytetrafluoroethylene | 0.14 |
| Polyethylene | 0.19 |
| Borosilicate glass | 0.60 |
| Quartz | 4 to 7 |

However, despite low thermal conductivities, the small-diameter tubes of this invention have been found to be unexpectedly effective in dissipating the high heats of reaction. The small-diameter tubes, with their corresponding thin-wall construction, minimize the wall resistance to heat conduction. Also, cooling surface area for a given volume of reactants in the polymeric resin tube is greatly increased. This increased ratio of cooling surface area to volume more than counterbalances the loss in heat removal suffered from the low thermal conductivity of these polymeric resin materials. In addition, the small-diameter tubes give such complete control of reaction temperature that the conversion and yield rates for the heat-sensitive, free-radical photochemical reaction is greatly increased.

With regard to the small-diameter reaction tubes, however, it has been well recognized that free-radical reactions are inhibited by surfaces. Actually, a high surface area to reactor volume ratio would be expected to lead to the termination of the free-radical reaction. Thus, generally speaking, small-diameter tubes with their high surface to volume ratios should not be an advantageous photochemical reactor design. However, the photochemical reactor of this invention, containing the small-diameter polymeric resin tubes, gives unexpectedly high rates of conversion and high yields of product in spite of its high surface to reaction volume ratio.

As heretofore stated, the polymeric resinous materials used to make the reactor tubes of this invention are quite transparent in the ultraviolet and visible ranges. The transmission of radiant energy through a material is measured by directing a beam of light through the material to a receiver. The percent transmission is the intensity of energy received by the receiver in relation to the intensity transmitted by the source. In Table II below, the percent light transmission through a 5-mil film of tetrafluoroethylene-hexafluoropropylene copolymer at various wavelengths is given.

TABLE II

| Wavelengths (A.) | Percent transmission |
|---|---|
| 2200 | 48 |
| 2500 | 55 |
| 3000 | 68 |
| 3500 | 76 |
| 4000 | 82 |
| 4500 | 86 |
| 5000 | 89 |
| 6000 | 92 |

The radiation which was not received by the receiver was not absorbed, but most likely lost to scattering. In multitubular reactors, the scattered light would not be entirely lost, since some of the scattered light would be picked up by adjacent tubes.

The polymeric resin tubes used in the photochemical reactor of this invention have been found stable to photochemical reaction conditions. If the polymeric tubes absorbed the radiant energy or were not chemically inert to the reaction taking place within the tubes, then a drop-off in reaction conversions would be expected over a period of time. However, the following table shows that reaction conversions are not significantly affected by the length of time polymeric resin tubes are in operation. The results set forth in the table were obtained by feeding an approximately 50/50 mixture of difluoroethane and chlorine at the rate of 100 cc./min. through an ultraviolet irradiated tube made of a copolymer of tetrafluoroethylene-hexafluoropropylene of 0.1 inch O.D. and 0.08 inch I.D. The chlorodifluoroethane yields versus continuous reaction time was noted and is set forth in Table III below.

TABLE III

| Continuous reaction time (hrs.) | Feed ratio, Cl₂/CHF₂CH₃ | Difluoroethane conversion percent | Chlorodifluoroethane yield, percent |
|---|---|---|---|
| 100 | 1.0 | 100 | 98.0 |
| 200 | 1.0 | 100 | 97.1 |
| 300 | 1.0 | 100 | 97.9 |
| 450 | 1.0 | 100 | 97.9 |
| 550 | 1.0 | 99.9 | 97.7 |
| 740 | 1.0 | 98.9 | 97.1 |
| 830 | 1.0 | 99.9 | 98.9 |
| 1,050 | 1.0+ | 100 | 94.9 |
| 1,210 | 1.0+ | 100 | 93.5 |
| 1,360 | 1.0 | 99.98 | 97.8 |
| 2,520 | 1.0 | 99.8 | 97.0 |

Since essentially no change in either difluoroethane conversion or chlorodifluoroethane yield is noted in the above table after 2520 hours, it is apparent that no change in light transmission characteristics occurred in the tubing during exposure to either the chemical reactants or ultraviolet radiation.

In addition to the above, the physical strength of the reactor tubes made from the polymeric resins of this invention is not affected by exposure to ultraviolet radiation. Table IV below shows that after 1000 hours exposure to the chlorination of difluoroethane in an ultraviolet environment, a tube made from tetrafluoroethylene-hexafluoropropylene copolymer, having a 0.1 inch O.D. and 0.08 inch I.D., showed essentially no effect as evidenced by the burst strength of the tubing.

TABLE IV

Tube performance vs. time (Difluoroethane chlorination)

| Time on stream (hrs.): | Burst pressure (p.s.i.g.) |
|---|---|
| 0 | 535 at 100° F. |
| | 205 at 250° F. |
| 1000 | 515 at 100° F. |
| | 205 at 250° F. |

This tube performance under these conditions shows the exceptional chemical and radiation stability of this polymeric resin material.

Due to the exceptional chemical and radiation stability of the polymeric resin tubes of this invention, a broad range of photochemical reactions are possible. For example, photochemical reactions involving hydrogen fluoride and acetic acid can be easily accomplished in the preferred tetrafluoroethylene-hexafluoropropylene copolymer reactor tube of this invention, whereas such materials would attack tubes made of silica materials such as glass.

The ultraviolet and visible light region is the most effective area in photochemical activation. This is due to the fact that ultraviolet and visible light alters the outer shell of electrons in the molecule, which effects most chemical reactions. A wide variety of ultraviolet light-visible light sources ranging from 220 A. to 6000 A. in wavelength are presently on the market with up to 20 kw. in power output.

It is to be understood that the particular design of photochemical reactors utilizing the small-diameter reactor tubes made from polymeric resins in accordance with this invention may vary widely and depends on the specific photochemical reaction involved. However, for a better understanding of the present invention, the following description of a specific, illustrative arrangement for mounting the reactor tubes around the light source in a compact array in a photochemical reactor design is provided in conjunction with the appended patent drawing in which.

Figure 1:
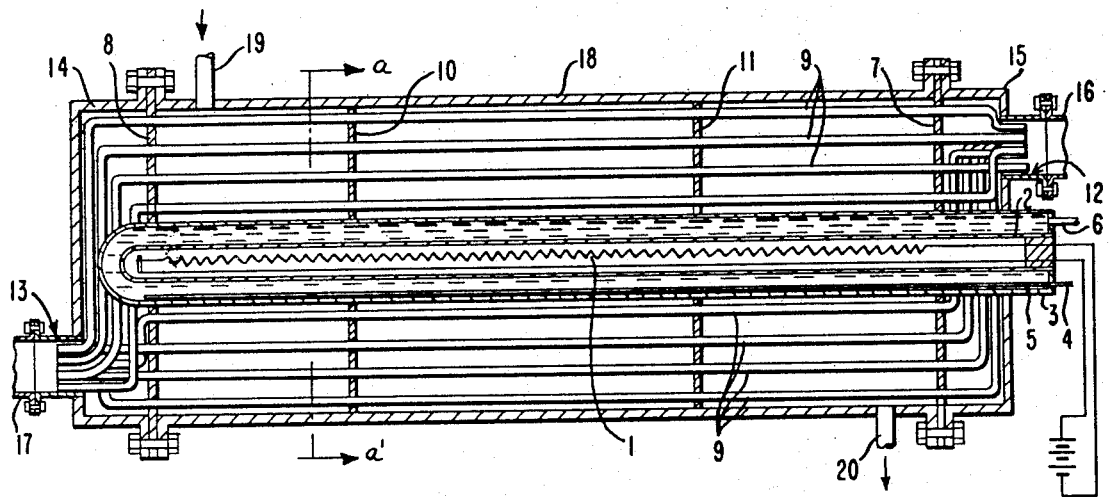
FIG. 1 is an elevational view in section of the photochemical reactor utilizing the small-diameter polymeric reactor tubes. For purposes of illustration, the tubes in this view have been revolved to the plane of the section.

In the photochemical reactor, as more particularly illustrated in FIG. 1, an electrical light source 1 is contained in a closed end casing 2 in the center of the reactor. The casing can be made of any suitable construction material which transmits radiant energy and can withstand the heat generated by the light source. The light source casing 2 is in turn enclosed in a larger outer casing 3 similarly made from any material which can withstand the use temperature and transmit the radiant energy. Casings 2 and 3 are usually made from silica-containing materials. In the area between the casing 2 and the outer casing 3, a cooling fluid such as water is continuously circulated to remove the heat generated by the light source from the reactor. The cooling fluid enters at 4 and is forced down a tube 5 to the bottom of the casing and circulates between the casings 2 and 3 before the fluid exits at 6.

Figure 2:
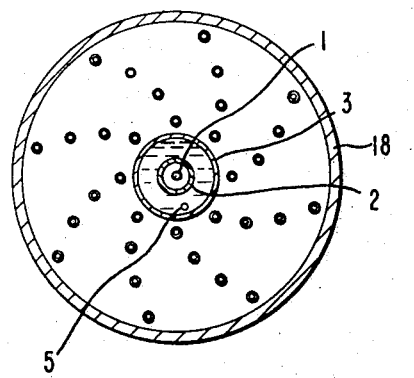
FIG. 2 represents a transverse cross-sectional end view taken along plane a–a' of FIG. 1.

Two header plates 7 and 8 encompass the light source at its ends which contain a series of holes through which the polymeric resin reactor tubes 9 are inserted. Additional support plates, such as 10 and 11, can be used to maintain the reactor tubes in a fixed relationship to the light source as shown in FIG. 2. An illustrative arrangement of reactor tubes around the light source is shown in FIG. 2. After the tubes pass through the header plates 7 and 8, they are bunched together into a tight bundle and exit through conduits 12 and 13 in detachable end sections 14 and 15. At the point where the bundles pass into conduits 12 and 13, a seal is made from a tough potting resin such as an epoxy resin or equivalent plastic material to provide a leak-proof joint. The conduits 12 and 13 are connected to common feed 16 and exit lines 17. The detachable end sections 14 and 15, header plates 7 and 8, as well as support plates 10 and 11, can be made of any suitable material such as metal or plastic.

The detachable end sections 14 and 15 are attached rigidly to the right and left ends of the reactor casing 18. A cooling fluid, such as water, is usually circulated around the tubes to aid in the removal of the heat generated by the photochemical reaction within the polymeric resin reaction tubes. The cooling fluid enters at inlet 19 and exits through outlet 20. Various sealing methods well within the skill of the art may be used to insure that the cooling fluid does not escape.

In operation, the reactant materials are fed under pressure through feed line 16 and sealed conduit 12 into reactor tubes 9. The reactants then flow past the light source 1 wherein the photochemical reaction is initiated. The reaction products pass out of the reactor tubes through sealed conduit 13 and out through exit line 17 to the product storage area. If desired, heat removal from the light source and reactor tubes can be enhanced by maintaining a flow of cooling fluid within the reactor casing and around the light source.

The photochemical reactor of this invention finds wide application in the chemical industry wherever photochemical reactions are used. It has been found, however, that the photochemical reactor of this invention is particularly suited for halogenating organic compounds. For instance, methane can be readily chlorinated in the subject reactor to methyl chloride, methylene chloride, chloroform, and carbon tetrachloride. Another preferred gas phase halogenation-type reaction of organic compounds which can be successfully accomplished in high yields in the photochemical reactor of this invention is the reaction between 1,1-difluoroethane and chlorine. In this process, it is most preferred to carry out the reaction in reactor tubes fabricated from tetrafluoroethylene-hexafluoropropylene copolymer at temperatures of from about 0° C. to about 225° C. and at a reaction pressure of less than 75 p.s.i.g. It is also preferred to contact the reactants at a chlorine to difluoroethane molar ratio of from 0.1 to 1.5 and to have residence times of the reactants in the reactor of from 0.1 to 20 seconds. Of course, it is to be understood that, in the selection and combination of these preferred reaction conditions, the skilled art worker will consider the effect of these conditions on the polymeric resin tubes and will not operate the process under conditions which will destroy or damage the polymeric resin reactor tubes.

The following examples are, therefore, illustrative of the halogenation-type reactions of organic compounds which can be successfully accomplished in the photochemical reactor of this invention. The reactor used in the following examples comprised an ultraviolet lamp source such as a Hanovia 550 watt high pressure mercury vapor lamp enclosed in an immersion well to keep the lamp from overheating. Water cooling was used in the immersion well. A 5-foot "Teflon" FEP (tetrafluoroethylene-hexafluoropropylene copolymer) tubing having a 0.08 inch I.D. and a wall thickness of 0.01 inch was used as the reactor tube. Attached to the reactor tube were mixing chambers wherein the reactants could be mixed and fed to the reactor tube. Where pressure was used, this was accomplished by attaching a back pressure regulator to the effluent end of the reactor tube. Where necessary, the back pressure regulator was heated to from 60° C. to 70° C. to prevent condensation in the regulator. Following the back pressure regulator, the effluent was diluted with helium in order to keep the products vaporized. The products thereafter were vented. Samples were pulled from the exit line of the reactor tube with a hypodermic syringe and immediately analyzed by vapor phase chromatography. When atmospheric pressure was used, the same procedure was followed except that no back pressure regulator was used and the helium dilution was not needed to keep the products vaporized. The "Teflon" tube was wrapped around the immersion well and taped in place. The reactor was set in a vertical position so that the feed was introduced to the reactor tube at the top of the reactor. Natural air convection was sufficient to cool the "Teflon" reactor tube.

EXAMPLE 1

Methane and chlorine gas were fed through a rotameter in a 1/1 feed mole ratio at a rate of 35 cc./min. The reactor tubes were at ambient temperatures and the reactor was run at atmospheric pressure. Prior to turning on the ultraviolet light source, a sample at the effluent was analyzed in the vapor phase chromatograph. No product was found; the chromatograph only detected the feed gas methane. After the ultraviolet light had been on for 18 minutes, another sample was taken. Good yields of methyl chloride, methylene chloride, chloroform, and carbon tetrachloride were found. The product distribution was in proportion to the degree of chlorination, that is, the product stream was highest in methyl chloride and lowest in carbon tetrachloride. The conversion rate was high. Another sample was taken 28 minutes after the ultraviolet light was turned on. Analysis in the chromatograph showed that yields and conversion rates were the same as well as product distribution.

EXAMPLE 2

The chlorination of methane was repeated except that a back pressure regulator was used so that the chlorination was conducted at a pressure of 10 p.s.i.g. The reaction was conducted at ambient temperatures. The rotameters were set so that 60 cc./min. of reactants flowed through the reaction tube with the feed mole ratio of $Cl_2CH_4$ being equal to 4. Prior to turning on the ultraviolet light, analysis of the reactor effluent showed that no product was formed. After the ultraviolet light source was turned on, the gas chromatograph showed that good yields of methyl chloride, methylene chloride, chloroform, and carbon tetrachloride were obtained. The product distribution was changed in that chloroform was the predominant product. The higher pressure as well as the increased chlorine in the feed significantly increased the conversion of methane to the halogenated products.

EXAMPLE 3

Following the procedure of Example 1, propane and chlorine were fed through the rotameters so that a mixture of the gas flowed through the reaction tube at a flow rate of 40 cc./min. and at a mole ratio of $Cl_2/C_3H_8$ of 2/3. The reaction was carried out at atmospheric pressure and at ambient temperatures. Prior to turning on the light source, no reaction product was detected by the gas chromatograph. Upon turning on the light source, the gas chromatograph analyzed that 1 - chloropropane and 2-chloropropane were obtained in good yields and in good conversion rates. When the $Cl_2/C_3H_8$ ratio was increased to 1.0 or greater, the $C_3H_8$ conversion gave noticeable yields of dichloropropane.

EXAMPLE 4

Repeating the procedure of Example 1, ethyl chloride and chlorine were fed through the rotameters and mixed in the reaction tube to the extent that the flow rate was 50 cc./min. and the molar feed ratio of chlorine to ethyl chloride was 1/1. The reaction was carried out at atmospheric pressure and under ambient temperatures. With the ultraviolet light source on, excellent reaction control was obtained and a liquid product was formed. The liquid product was analyzed and found to be a mixture of dichloro- and trichloroethanes. High conversion of ethyl chloride and good yields of the major components were obtained.

EXAMPLE 5

Following the procedure of Example 1, 1,1-difluoroethane and chlorine were fed through the rotameters and mixed in the reactor tube to give a flow rate of 60 cc./min. The molar feed ratio of chlorine to difluoroethane was 1/1. The reaction was carried out at atmospheric pressure and at ambient temperatures. Under the initiation of the ultraviolet light source, the reaction proceeded to give good yields of 1-chloro-1,1-difluoroethane. Upon increasing the molar feed ratio of chlorine to difluoroethane to 1.8, it was found that essentially quantitative conversion of the difluoroethane was obtained.

The procedure of this example was repeated except that tubes made from other polymer resins of this invention were substituted for the "Teflon" FEP (tetrafluoroethylene-hexafluoropropylene copolymer) tubing. The results obtained are given in the following table. The tube diameter, length, and wall thickness are given in each case.

EXAMPLE 6

Following the procedure of Example 1, $Cl_2$ and CO were fed into the reactor tube in a mole ratio of 1.0 at a rate of 50 cc./min. The reaction was carried out at room temperature and at atmospheric pressure. In the presence of ordinary room light, a minor amount of phosgene was detected. When the light source was turned on, an active reaction took place. Analysis on the vapor phase chromatograph indicated that phosgene was the exclusive product.

EXAMPLE 7

The photochemical reactor of Example 1 was modified in that four additional reactor tubes made from "Teflon" FEP were inserted into the reactor. The reactor tubes were bundled and spiraled around the light source. The spiraled reactor tubes formed a circle 8 inches in diameter around the light source. The tubes were from 12 to 13 feet in length. The tubes were inserted into conduit and sealed with an epoxy resin at each end. The reactor tubes were immersed in water. Using a back regulator, the reactants hexafluoropropylene and $Cl_2$ were passed through the reactor tubes at 30 p.s.i.g. The reaction was carried out at ambient temperatures. The hexafluoropropylene flow rate was 1480 cc./min. at STP. The chlorine flow rate was about 1600 cc./min. at STP. The molar feed ratio of $Cl_2$ to hexafluoropropylene was 1/1. A liquid product was obtained by running the reactor effluent from the back pressure regulator into a 20% by weight NaOH solution. The caustic solution removed the excess chlorine. The liquid product, 1,2-dichlorohexafluoropropane, was obtained from the caustic solution. The yield of 1,2-dichlorohexafluoropropane was 99.5%.

When the procedure was repeated at a reaction pressure of 40 p.s.i.g., a reactant flow rate of 6500 cc./min., and a molar feed ratio of 1.0, a yield of 99.7% of 1,2-dichlorohexafluoropropane was obtained.

EXAMPLE 8

The photochemical reactor of Example 1 was modified in that the 550 watt light source was replaced by a Hanovia 3500 watt high pressure mercury vapor lamp and the reaction tubes were suspended in front of the light source over a length of four feet. A water-cooled bath was also circulated around the tubes to help control reaction temperature.

Using this modified reactor chlorine and 1,1-difluoroethane were reacted under the following conditions. The chlorine to difluoroethane molar feed ratio was 0.5. The reaction pressure was 15 p.s.i.g. The reaction temperature was controlled to a temperature between 75° C. to 150° C. The residence time in the reactor was 3 seconds. After the ultraviolet light was on for 60 minutes, a product sample was taken. The yield of 1-chloro-1,1-difluoroethane was 98.3%. The chlorine conversion was 99.9% as measured by chemical analysis.

EXAMPLE 9

Using the modified reactor of Example 8, the reaction of chlorine and 1,1-difluoroethane was carried out under the following conditions. The chlorine to difluoroethane molar feed ratio used was 1.3. The reaction temperature was from about 100° C. to 175° C. The reaction pressure was 15 p.s.i.g. The residence time of the reactants in the tube was 3 seconds. After the ultraviolet light was on for 60 minutes, a product sample was taken. The yield of 1-chloro-1,1-difluoroethane was 96.7%. The conversion of difluoroethane was 99.9%.

TABLE V.—DIFLUOROETHANE CHLORINATIONS IN VARIOUS POLYMERIC TUBES

| Trade name | Polymer composition | Tube diameter mm. | Wall thickness, mm. | Tube length, cm. | Difluoroethane conversion | Chlorodifluoroethane yield |
|---|---|---|---|---|---|---|
| Teflon FEP | Tetrafluoroethylene-hexafluoropropylene copolymer | 2.5 | 0.25 | 152 | 95 | 96 |
|  |  |  |  |  | 98 | 97 |
|  |  | 6.3 | 0.25 | 152 | 92 | 93 |
|  |  | 6.3 | 0.63 | 152 | 95 | 94 |
| Teflon TFE | Tetrafluoropropylene polymer | 2.5 | 0.25 | 117 | 80 | 97 |
| Kel F | Chlorotrifluoroethylene polymer | 2.1 | 0.25 | 152 | 97 | 98 |
| Kynar | Vinylidene fluoride polymer | 2.5 | 0.25 | 152 | 88 | 97 |
| Saran | Vinyl chloride-vinylidene copolymer | 6.3 | 1.00 | 152 | 75 | 97 |
| Tygon | Plasticized vinyl chloride polymer | 9.5 | 1.50 | 152 | 68 | 95 |
| Nylon | Polyamide | 3.2 | 0.70 | 124 | 95 | 95 |
| Do | Polyethylene | 2.5 | 0.25 | 152 | 72 | 97 |

EXAMPLE 10

Using the modified reactor of Example 8, the reaction of chlorine and 1,1-difluoroethane was carried out under the following reaction conditions. The chlorine to difluoroethane molar feed ratio used was 0.9. The reaction temperature was from about 100° C. to 175° C. The reaction pressure was 15 p.s.i.g. The residence time of the reactants in the reactor was 1 second. After the ultraviolet light source had been activated for 60 minutes, a product sample was taken. The yield of 1-chloro-1,1-difluoroethane was 96.3%. The conversion of difluoroethane was 87%. The chlorine conversion was 96% as determined by chemical analysis.

EXAMPLE 11

Using the modified reactor of Example 8, the photochemical reaction of chlorine with 1,1-difluoroethane was carried out under the following reaction conditions. The chlorine to difluoroethane molar feed ratio used was 0.5. The reaction temperature was from about 70° C. to 100° C. The reaction pressure was 30 p.s.i.g. The residence time of the reactants in the reactor was 5 seconds. After the ultraviolet light had been activated for 60 minutes, a product sample was taken. The yield of 1-chloro-1,1-difluoroethane was 97.2%. The chlorine conversion was 99.9% by chemical analysis.

It is to be understood that the preceding examples are representative of the type of process which can be carried out in photochemical reactors of this invention and that said examples may be varied within the scope of the total specification, as understood by one skilled in the art, to produce essentially the same results. For example, depending on the particular product desired, the time of reaction can be varied over wide ranges. The only limitation on reaction temperature and pressure is the ability of the polymeric reactor tubes to withstand the desired reaction conditions. Other variations such as the use of additional catalysts as well as carrier solvents for the reactants are well within the skill of the art.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A photochemical reactor comprising a source of ultraviolet and visible light radiant energy, at least one reactor tube of from about 0.08 inch to about 0.25 inch outside diameter with a wall thickness ranging from 3% to 15% of said outside diameter, support means for maintaining said tube in a fixed distance relationship to said source of radiant energy, means for introducing and passing reactant materials through said reactor tube, said reactor tube being fabricated from a polymeric resin capable of transmitting said reaction-inducing radiant energy of from 2200 A. to 6000 A.

2. The photochemical reactor of claim 1 wherein a multitude of reactor tubes are employed.

3. A photochemical reactor according to claim 2 wherein said reactor tubes are fabricated from homopolymers and copolymers of $C_2$ to $C_3$ ethylenically unsaturated monomers.

4. A photochemical reactor according to claim 2 wherein the reactor tubes are homopolymers and copolymers of halogenated $C_2$ to $C_3$ ethylenically unsaturated monomers.

5. A photochemical reactor of claim 2 wherein the reactor tubes are fabricated from polymeric resins selected from the group consisting of polytetrafluoroethylene, tetrafluoroethylene-hexafluoropropylene copolymer, polychlorotrifluoroethylene, polyvinylidene fluoride, vinyl chloridevinylidene chloride copolymer, and polyethylene.

6. A photochemical reactor according to claim 2 wherein the source of radiant energy and reactor tubes are enclosed in a housing and the reaction temperature is controlled by circulating a cooling fluid through said housing.

7. The photochemical reactor of claim 2 wherein the reactor tubes surround the source of radiant energy and are fabricated from tetrafluoroethylene-hexafluoropropylene copolymers.

8. In a process for conducting a radiation-initiated chemical reaction, the improvement which comprises carrying out the reaction in the presence of a radiation source in a multiude of reaction tubes fabricated from a polymeric resin capable of transmitting radiant energy from 2200 A. to 6000 A., said tubes having an outside diameter of from 0.08 inch to 0.25 inch and a wall thickness of from 3% to 15% of said outside diameter.

9. The process of claim 8 wherein the reaction temperature is controlled by continuously moving a heat transfer medium past the surfaces of said reaction tubes.

10. The process of claim 8 wherein an organic compound is reacted with a halogen.

11. The process of claim 8 wherein an organic compound is reacted with chlorine in the gas phase.

12. The process of claim 8 wherein 1,1-difluoroethane is converted to 1-chloro-1,1-difluoroethane.

13. The process of claim 8 wherein the photochemical reaction is the conversion of 1,1-difluoroethane to 1-chloro-1,1-difluoroethane, the reaction tubes are fabricated from tetrafluoroethylene-hexafluoropropylene copolymer, and a heat transfer medium is continuously moving past the surfaces of said reaction tubes, and wherein the reaction is carried out (A) at a chlorine to difluoroethane mole ratio of from 0.1 to 1.5,
   (B) at a reaction temperature of from about 0° C. to about 225° C.,
   (C) at a reaction pressure of less than 75 p.s.i.g., and
   (D) at a residence time of the reactants in the reaction tubes of from 0.1 to 20 seconds.

14. The process of claim 8 wherein hexafluoropropylene is converted to 1,2-dichlorohexafluoropropane.

15. The process of claim 8 wherein the reaction tubes are fabricated from tetrafluoroethylene-hexafluoropropylene copolymer.

References Cited

UNITED STATES PATENTS

| | | | |
|---|---|---|---|
| 3,255,098 | 6/1966 | Anello et al. | 204—163 |
| 2,436,366 | 2/1948 | Sconec et al. | |
| 2,861,032 | 11/1958 | Scherer | 204—163 |
| 2,890,990 | 6/1959 | Boynton et al. | 204—162 |

FOREIGN PATENTS

| | | | |
|---|---|---|---|
| 986,348 | 3/1965 | Great Britain. | |
| 665,574 | 6/1963 | Canada | 204—158 |

HOWARD S. WILLIAMS, Primary Examiner

U.S. Cl. X.R.

204—158, 193